Aug. 27, 1963 F. W. KULICKE, JR 3,101,635

FINE WIRE BONDING TOOL

Filed Nov. 8, 1960 2 Sheets-Sheet 1

INVENTOR
Frederick W. Kulicke, Jr
BY
Bilker & Moyerman
ATTORNEYS

Aug. 27, 1963 F. W. KULICKE, JR 3,101,635

FINE WIRE BONDING TOOL

Filed Nov. 8, 1960 2 Sheets-Sheet 2

INVENTOR
Frederick W. Kulicke, Jr.
BY
Bilher & Moyerman
ATTORNEYS

United States Patent Office 3,101,635
Patented Aug. 27, 1963

3,101,635
FINE WIRE BONDING TOOL
Frederick W. Kulicke, Jr., Philadelphia, Pa., assignor to Kulicke and Soffa Manufacturing Company, Fort Washington, Pa., a corporation of Pennsylvania
Filed Nov. 8, 1960, Ser. No. 68,121
6 Claims. (Cl. 78—82)

This invention relates to a bonding tool, and more particularly relates to a bonding needle for thermocompressively securing extremely fine lead wire and whiskers to semi-conductor crystals and micro-modules.

This application is a continuation-in-part of my prior co-pending patent application filed July 5, 1960, Serial No. 40,890.

In the parent application, there was shown a manipulating, positioning and bonding device for securing extremely fine gauge wire or whiskers between minute stripes on semi-conductor crystal wafers and the respective terminal posts of transistor headers. The bonding tool employed in the foregoing device utilized a steel or sapphire needle having a conical end, the point of which had a radius thereon so that a line contact edge would be defined for compressively engaging the fine wire against a precisely manipulated position on the crystal or header. The bonding needle in this prior construction was also relieved by a notch at the pointed end to facilitate manipulation of the needle and visibility therebelow because the diminutive nature of the parts being bonded necessarily required observation under magnification through a microscope.

Again, in the device set forth in the prior application, heating of the parts to be bonded was accomplished by means of a heating element inserted within a miniature table, called a heat column, which held the transistor header in place. Thus, the operator relied upon a rather generalized heat application which capsulated the entire transistor header and which was thereafter transmitted through the portion of the lead wire compressed thereagainst to the bonding tool or needle in contacting engagement with the wire. That is, neither the bonding hammer of the prior construction nor the needle held therein was heated directly. It was therefore impossible heretofore to apply heat directly to the specific local area or zone where the bond was to be secured. As a result, excessive heat was required to be applied to the header itself in order to compensate for heat losses by convection, conduction and/or radiation and still insure that the specific point of thermocompression bonding was at bonding temperature.

Lastly, the construction of the prior bonding needle was such as to require complete change of the entire needle assembly if the point should have become worn or fractured even during normal use. That is, the jewel point of the needle was press-fit within a needle holder as an integral unit thereby making it expensive to replace the entire needle assembly when only the point had lost its efficacy.

Today, as a result of rapid technological advancement in the semi-conductor and solid state physical arts, individual crystal components are mounted in plurality upon a sheet or board, known as a substrate, to define a micro-module similar in effect to the printed circuit boards now so well accepted and utilized in the electronic miniaturization programs. However, because of their size and sensitivity, these micro-modules require (1) the bonding of a great many extremely fine whiskers to extremely minute stripes, crystals and circuits respectively, (2) maintaining tautness of the lead wires and whiskers so as not to interfere with adjacent circuitry or vary appreciably the characteristics of the individual components on the substrate, and (3) accomplishing the thermocompression bonding operations without destroying relatively low temperature soldered connections or temperature sensitive components by the application of excessive heat. It is, of course, realized that the micro-modular construction is necessarily much bulkier than the simpler single transistor capsule, and accordingly application of heat generally would likely produce excessive temperatures at particular areas as set forth herein above in addition to the probability of insufficient heat at the point of bonding as a result of a cold bonding needle withdrawing heat and lowering the temperature at the contact point from natural conduction, convection and radiation.

It is therefore an object of this invention to provide an improved bonding tool for thermocompressively securing extremely fine lead wire and whiskers to semiconductor components.

Another object of this invention is to provide an improved bonding tool for thermocompression securing operations on fine wire wherein heat can be applied locally and with precise control at the exact point where the bond is to be secured.

Another object of this invention is to provide an improved thermocompression bonding tool wherein excessive heat applications to temperature sensitive areas is completely eliminated.

Another object of this invention is to provide an improved thermocompression bonding tool wherein replacement of bonding needles may be easily effected at a minimum of cost.

Another object of this invention is to provide an improved bonding needle for thermocompressively securing fine wire to semi-conductor components without danger of contamination which could cause interference with and variation in internal characteristics of such components.

Another object of this invention is to provide an improved thermocompression bonding tool which will secure fine wire to semi-conductor components and thereafter, when desired, cut off the wire ends cleanly without fraying or causing stress in the wire.

Another object of this invention is to provide an improved thermocompression bonding tool for applying very high concentrations of bonding pressure within and at a specific localized area.

Other objects of this invention are to provide an improved device of the character described that is easily and economically produced, which is sturdy in construction and which is highly efficient in operation.

With the above and related objects in view, this invention consists of the details of construction and combination of parts as will be more fully understood from the following detailed description when read in conjunction with the accompanying drawing in which.

Figures 1, 2, 3, 4, 9, 10, 11, 12:
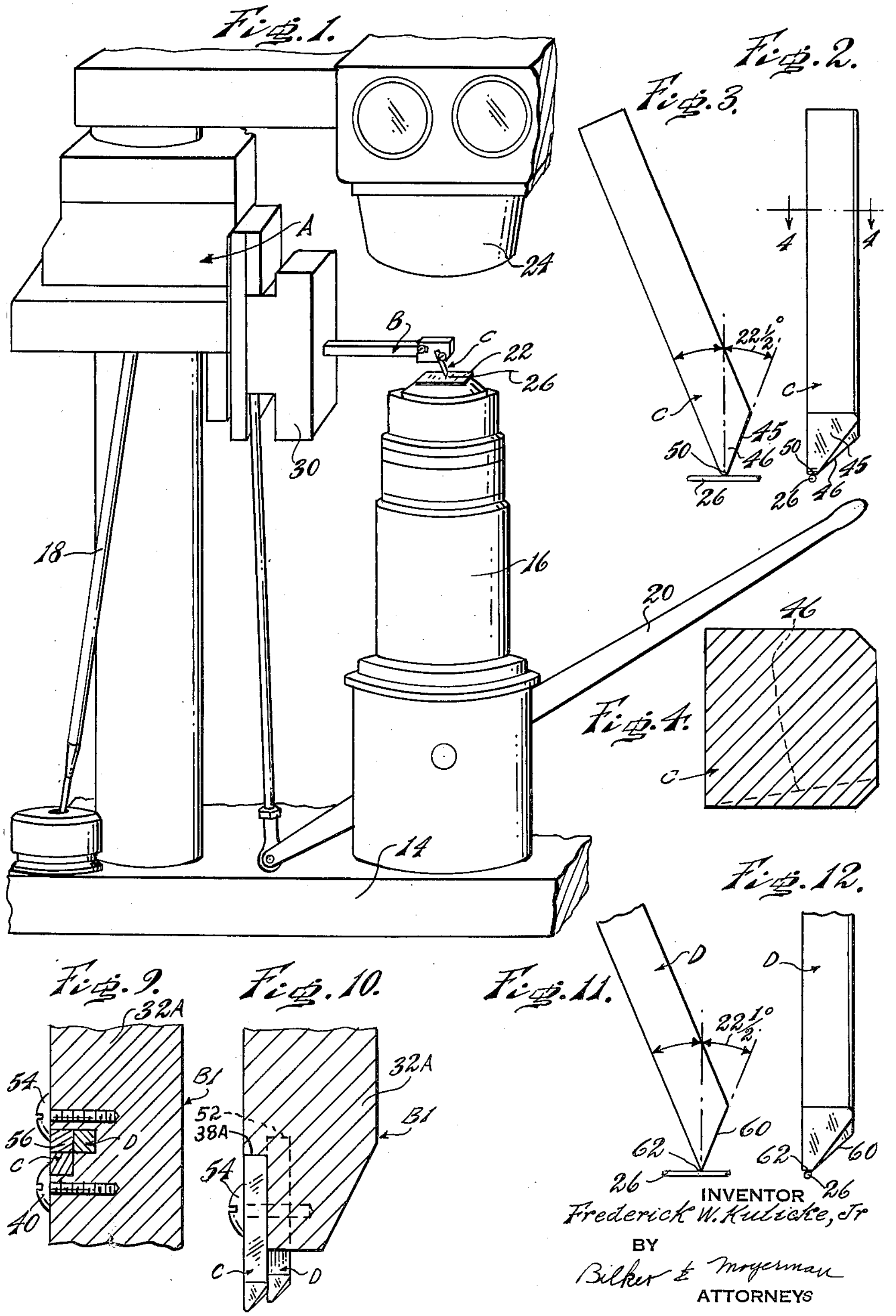
FIG. 1 is a perspective front elevational view of an improved thermocompression bonding tool embodying this invention.
FIG. 2 is an enlarged front elevational view of a bonding needle embodied in this invention.
FIG. 3 is an enlarged side elevational view of the bonding needle.
FIG. 4 is a sectional view taken along lines 4—4 of FIG. 2.
FIG. 9 is a sectional view taken along lines 9—9 of FIG. 7.
FIG. 10 is a sectional view taken along lines 10—10 of FIG. 7.
FIG. 11 is an enlarged front elevational view of the cut-off wedge.
FIG. 12 is an enlarged side elevational view of the cut-off wedge.

Referring now in greater detail to the drawings, in which similar reference characters refer to similar parts, I show a thermocompression bonding tool comprising a frame, generally designated as A, a bonding head or hammer assembly mounted in said frame, and designated as B, which is adapted to be actuated in a vertical plane, a bonding needle generally designated as C, and a cut-off wedge generally designated as D, both detachably mounted within said head.

The frame A is substantially identical to that shown in my prior co-pending application, Serial Number 40,890, and comprises a base 14, a heat column or table 16 mounted on the base and horizontally, vertically and rotatably adjustable thereon, a manipulating rod 18 for horizontally orienting the head B so that the needle C or the cut-off wedge D is at the precise desired position, and an actuating arm 20 for pivotally depressing the head B. Since full details of the actuation and manipulation of the frame parts just mentioned are fully disclosed and described in the prior application, the vertical articulation of the head B through the lever 20 and horizontal manipulation of the head will not be further amplified here but are merely set forth herein to promote a better understanding of the present invention.

A micro-module 22 is affixed to the upper portion of the table 16 in a convenient manner well understood by those skilled in the art, and observation of the operations to be performed by this invention is made under magnification through microscope 24 adjustably secured to the upper portion of the frame A. The micro-module 22, for the purposes of illustration, may be any single semi-conductor or crystal wafer or plurality thereof in any combination which are affixed to a transistor header or substrate board wherein it is desired to complete the circuitry by bonding fine lead wires or whiskers 26 between stripes, junctions or terminal posts thereon. The lead wire 26 may be gold, copper, nickel or any other metal or combinations thereof depending upon the particular characteristics desired in the completed semi-conductor component. The wire gauge may be from 4 tenths of a mil to 5 mils.

Figure 5:
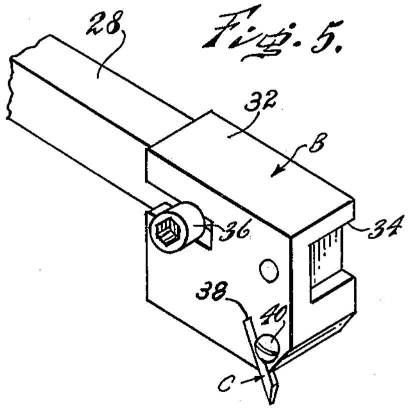
FIG. 5 is an enlarged perspective view of a bonding tool head embodied in this invention.

Referring now to FIGURE 5, the head assembly B comprises an arm 28 which is pivotally secured to the adjustable portion 30 of the frame A. A block 32 grooved at 34 is slidably supported upon the arm 28 and is adjustably positioned thereon by screw 36. The lower portion of one lateral face of the block 32 is slotted at 38 to receive the needle C and a set screw 40 threadedly engaged within a tapped hole in the block, adjacent slot 38, retains the needle in locked position by means of the overlapping screw head. It is to be observed that the needle axis is slightly angularly disposed from vertical.

Figure 6:
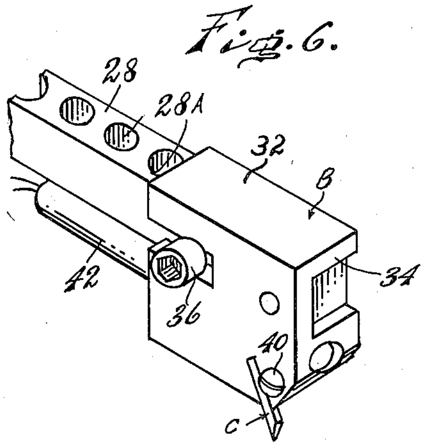
FIG. 6 is a perspective view of the bonding tool head shown in FIG. 5 but having a heating element incorporated therein.

The arrangement shown in FIGURE 5 has no heating element incorporated within the block 32 but instead relies on the heat supplied directly to the micro-module 22 from a heating element (not shown) mounted within the heat column or table 16. In FIGURE 6, a heating element 42 is mounted within a cored portion of the block 32 so that heat can be applied directly to the needle C which, in turn, is directed locally to the specific point of bonding. The heating element 42 is preferably a cartridge heater, for example, a 15 watt unit manufactured by Hot Watt of Danvers, Massachusetts, and described in their bulletin SC-121 dated January 1959, -95B. This is a stainless steel sheath cartridge heater with a steatite core wire wound element with maximum temperature 1250° C. In the FIGURE 6 head assembly the arm 28 has a plurality of longitudinally spaced holes 28A extending therethrough in order to dissipate heat generated by the cartridge element 42 thereby precluding excessive temperatures from being imposed on delicate machined linkages within the manipulatable portion 30 of the frame A.

The needle C comprises an elongated element of a hard, non-contaminating, temperature resistant material such as synthetic white sapphire. The needle is substantially rectangular in cross-section and tapers to a point created by chamfering and highly polishing angular facets 45 and 46 adjacent one end. A cylindrical radius 50 is generated at the point so that a line contact edge transverse to the axis of the wire 26 will be defined, when the needle C is pressed thereagainst. The bonding temperature is approximately 350° C. and the unit pressure concentration is approximately 30,000 p.s.i. It is to be observed that the tapered facets 45 and 46 enables the operator looking through the microscope 24 to see the needle point of contact directly and precisely without obstruction.

Figure 7:
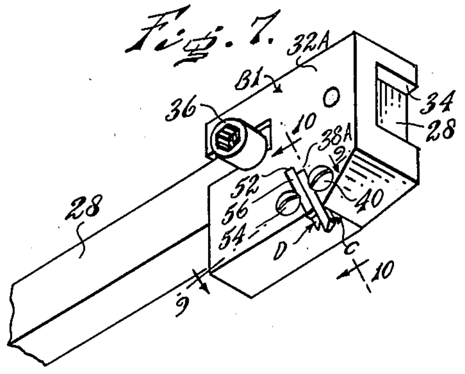
FIG. 7 is a perspective view of a modified bonding tool head having a cut-off wedge incorporated therewith.

Referring now to FIGURE 7, I show a modification of a bonding tool B1, comprising a block 32A adjustably secured to the arm 28 by screw 36. The block 32A has a pair of angularly disposed slots 52 and 38A disposed adjacently to one another in one of the lateral faces. The needle C is adjustably retained in slot 38A by screw 40 whereas the cut-off wedge D is adjustably retained in slot 52 by the head of screw 54 which is also threadedly engaging block 32A and bears against spacer bar 56. As may be seen from FIGURE 10, slot 52 is deeper than slot 38A, and spacer bar 56 maintains the point of the wedge D diagonally spaced from the point of the needle C. It is also to be observed that the point of the needle C is below that of the wedge D, both being so arranged to facilitate cut-off of the wire 26 at terminal posts as well as to be capable of functioning as will be more fully described hereinafter.

Figure 8:
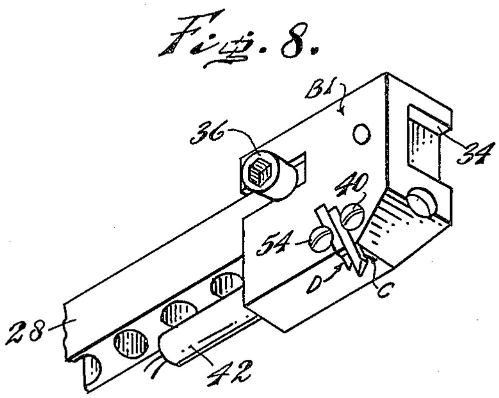
FIG. 8 is a perspective view of the modified bonding tool head shown in FIG. 7 with a heating element embodiment incorporated therein.

FIGURE 8 shows another embodiment of the FIGURE 7 modification wherein a cartridge heater 42 is incorporated within the block.

The wedge D as shown in FIGURES 11 and 12 also comprises a rectangular bar of white synthetic sapphire having a sharply beveled edge 60 which forms a keen cutting edge 62 with the intersecting side.

As is apparent from the foregoing description and that of my prior application, the bonding operation is first performed by urging the point of the needle C against the wire 26 so that the combined heat and pressure at the selected point of contact on the semiconductor will effect a thermocompression bond of the wire thereto. After similarly bonding the other end of that wire to a terminal post by appropriate manipulation of the stick 18, the point of the needle C is moved off the post, thereby permitting the edge of the wedge D to contact the free end of the wire. The bonding head B1 is depressed by pressing arm 20 downwardly, whereupon the edge 62 of the wedge will shear the wire.

Although this invention has been described in considerable detail, such description is intended as being illustrative rather than limiting since the invention may be variously embodied, and the scope of the invention is to be determined as claimed.

What is claimed is:

1. A bonding tool for thermocompressively securing fine wire to semiconductor components comprising a frame, a lever arm of rectangular cross-section horizontally extending from said frame and pivotally supported about a horizontal axis therein so that at least one vertical surface of said lever arm will define a reference plane parallel to the plane of pivotal rotation, a block having a rectangular groove therein complementary with said rectangular lever arm and slidably supported thereon so that a vertical face of said block will be a reference parallel to the vertical reference surface of said lever arm, means to clamp said block on said lever arm, a rectangular slot in the vertical reference face of said block disposed at an angle of 45° with the horizontal axis of said lever arm and having an internal wall parallel to the vertical reference face, a bonding needle having longitudinally-extending plane sides rectangularly disposed with respect to each other and complementary with said slot, a flat highly-polished plane facet at one end of said needle intersecting the longitudinal axis and one pair of opposed sides thereof at substantially a 45° angle and disposed perpendicular to the planes of the second pair of opposed sides to form a cuneiform point having an apical edge coextensive with one of the first mentioned pair of sides, a convex cylindrical surface generated on said edge from a radial axis parallel thereto, a second highly polished plane facet at the end of said needle perpendicular to the planes of the first mentioned pair of sides, intersecting one of the second pair of sides at substantially a 45° angle, and cutting across said cylindrical surface, said needle being detachably mounted in said slot with said cuneiform point projecting below the bottom of said block so that a plane bisecting the angle of said cuneiform point is perpendicular to the longitudinaly axis of said lever arm, and a screw in threaded engagement with said block adjacent said slot and having a head abutting against the outwardly facing side of said needle whereby said needle may be easily and rapidly secured within said block in accurately referenced position so that said cylindrical surface will make line contact with wire to be bonded to the semiconductor component, the cuneiform point of said needle defining an arrow for precisely positioning said needle at the point at which the bond is to be made, and the line contact being adapted to be oriented perpendicular to the axis of the wire in two planes without directly touching the semiconductor component.

2. In a tool for thermocompressively securing fine wire to semiconductor components, a bonding needle comprising longitudinally extending flat side walls rectangularly disposed with respect to each other, a flat, highly-polished plane facet at one end intersecting the longitudinal axis of said needle at substantially a 45° angle and perpendicular to one pair of opposed side walls to form a cuneiform point having an apical edge coextensive with one of the second pair of opposed side walls, a convex cylindrical surface generated on said edge, the radial axis of said cylindrical surface being parallel to said edge, and a second highly-polished plane facet perpendicular to the second pair of side walls and intersecting one of said first pair of side walls and the cylindrical surface at substantially a 45° angle whereby a cylindrical bonding surface will be defined in the end of said needle having a length slightly greater than the diameter of the wire to be bonded, the cylindrical surface being adapted to make a line contact oriented perpendicular to the axis of the wire in two planes without directly touching the semiconductor component, the cuneiform point defining an arrow for precisely positioning said needle at the location at which the bond is to be made.

3. A bonding tool for thermocompressively securing fine wire to semiconductor components comprising a frame, a lever arm of rectangular cross-section horizontally extending from said frame, a block having a rectangular groove complementary with said rectangular lever arm slidably supported thereon, means to clamp said block on said lever arm, a rectangular slot in a vertical face of said block disposed at an angle of 45° with the horizontal axis of said lever arm, a bonding needle having a rectangular cross-section complementary with said slot, a flat, highly-polished plane facet perpendicular to one pair of longitudinally-extending opposed sides on said needle and intersecting the second pair of longitudinally-extending opposed sides at an angle substantially at 45° thereto to define a cuneiform point having an apical edge coextensive with one of the second mentioned pair of sides, a convex cylindrical surface generated on said apical edge from a radial axis parallel thereto, a second highly-polished plane facet perpendicular to the second pair of opposed sides and intersecting one of the first-mentioned pair of sides and the cylindrical surface so that a bonding contact line on said cylindrical surface is of a length slightly greater than the diameter of the wire to be bonded, said needle being detachably mounted in said slot with the cuneiform point projecting below the bottom of said block so that a plane bisecting the angle of said cuneiform point is perpendicular to the longitudinal axis of said lever arm, and a screw in threaded engagement with said block adjacent said slot, said screw having a head abutting the outwardly facing side of said needle whereby said needle may be easily and rapidly secured within said block in accurately referenced position so that said cylindrical surface will make a line contact perpendicular to the axis of the wire in two planes without directly touching the semiconductor component during bonding and the cuneiform point of said needle will define an arrow for precisely positioning said needle at the point at which the bond is to be made.

4. The invention of claim 3 wherein a second rectangular slot is disposed in the vertical face of said block parallel to and immediately adjacent said first slot, a needle-like cut-off wedge having longitudinally-extending plane sides rectangularly disposed with respect to each other and complementary with said second slot, a flat highly-polished plane facet at one end of said cut-off wedge perpendicular to one pair of longitudinally-extending opposed sides thereof and intersecting the second pair of opposed sides thereof at an angle substantially at 45° thereto to define a V-shaped point having a sharp apical edge coextensive with one of the second mentioned pair of sides of said wedge, and a second highly-polished plane facet on said wedge perpendicular to the second pair of opposed sides thereof and intersecting one of the first mentioned pair of sides thereof and the edge of said V-shaped point so that the sharp edge is slightly longer than the diameter of the wire, said cut-off wedge being detachably secured in said second slot so that a plane bisecting the angle of said V-shaped point is perpendicular to the longitudinal axis of said lever arm and the line defined by the sharp edge of the V-shaped point is positioned above the radial axis of said cuneiform cylindrical surface and parallel thereto, the plane of the V-shaped point being further horizontally displaced with respect to the plane of the cuneiform point.

5. In a tool for thermocompressively securing fine wire to semiconductor components, a bonding needle comprising longitudinally-extending plane sides rectangularly disposed with respect to each other, a flat highly-polished plane facet at one end of said needle intersecting the longitudinal axis and one pair of opposed sides thereof at substantially a 45° angle and oriented perpendicular to the planes of the second pair of opposed sides to form a cuneiform point having an apical edge coextensive with one of the first mentioned pair of sides in accurately referenced disposition with respect to the sides of said needle, and a second highly-polished plane facet at the end of said needle intersecting the apical edge so that the length of said edge is slightly greater than the diameter of the wire to be bonded.

6. The invention of claim 5 wherein a convex cylindrical surface is generated along said edge from a radial axis parallel thereto so that said cylindrical surface is perpendicular to the side which it intersects.

References Cited in the file of this patent

UNITED STATES PATENTS

| | | |
|---|---|---|
| 646,967 | Ferry | Apr. 10, 1900 |
| 696,429 | Geisenhoner et al. | Apr. 1, 1902 |
| 1,226,536 | Krook | May 15, 1917 |
| 2,530,284 | Capps et al. | Nov. 14, 1950 |
| 2,628,104 | Shardlow | Feb. 10, 1953 |
| 2,639,633 | Sowter | May 26, 1953 |
| 2,639,634 | Sowter | May 26, 1953 |
| 2,668,355 | Clark | Feb. 9, 1954 |
| 2,707,826 | Sowter | May 10, 1955 |
| 2,894,321 | Dubilier | July 14, 1959 |